C. MILLER.
SAW GUIDE.
APPLICATION FILED APR. 27, 1910.

973,953.

Patented Oct. 25, 1910.
2 SHEETS—SHEET 1.

Witnesses

Inventor
Conda Miller.
By Victor J. Evans.
Attorney

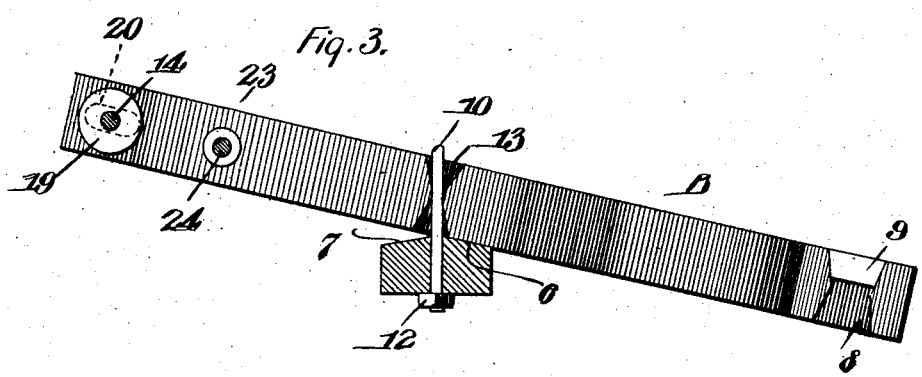
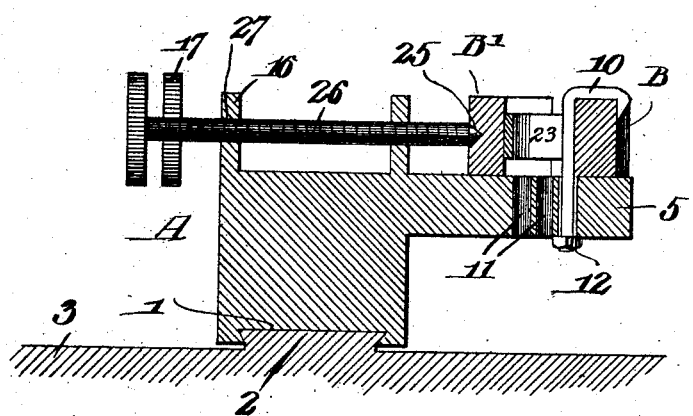

UNITED STATES PATENT OFFICE.

CONDA MILLER, OF WOODBURY, PENNSYLVANIA.

SAW-GUIDE.

973,953.

Specification of Letters Patent.

Patented Oct. 25, 1910.

Application filed April 27, 1910. Serial No. 557,885.

*To all whom it may concern:*

Be it known that I, CONDA MILLER, a citizen of the United States, residing at Woodbury, in the county of Bedford and State of Pennsylvania, have invented new and useful Improvements in Saw-Guides, of which the following is a specification.

This invention relates to guides for circular saws and the invention has for one of its objects to improve and simplify the construction and operation of devices of this character so as to be comparatively simple and inexpensive to manufacture, reliable and efficient in use, and readily adjusted.

Another object of the invention is the provision of a saw guide which can be readily converted for use with right or left mills, the jaws or guide arms being reversibly mounted on the body or frame.

Figure 1:
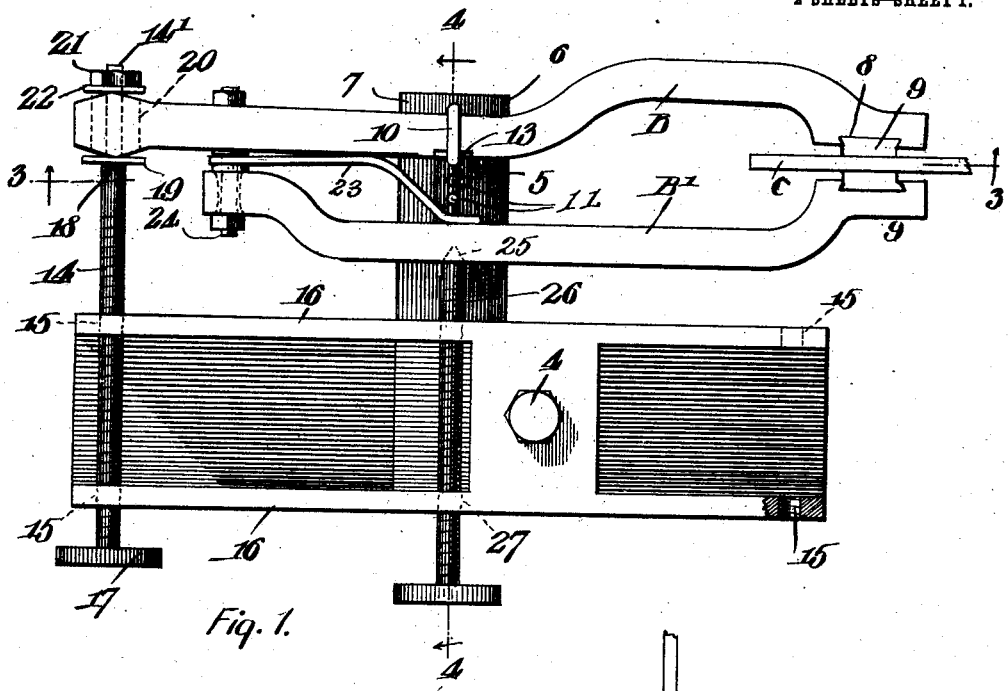
Figure 2:
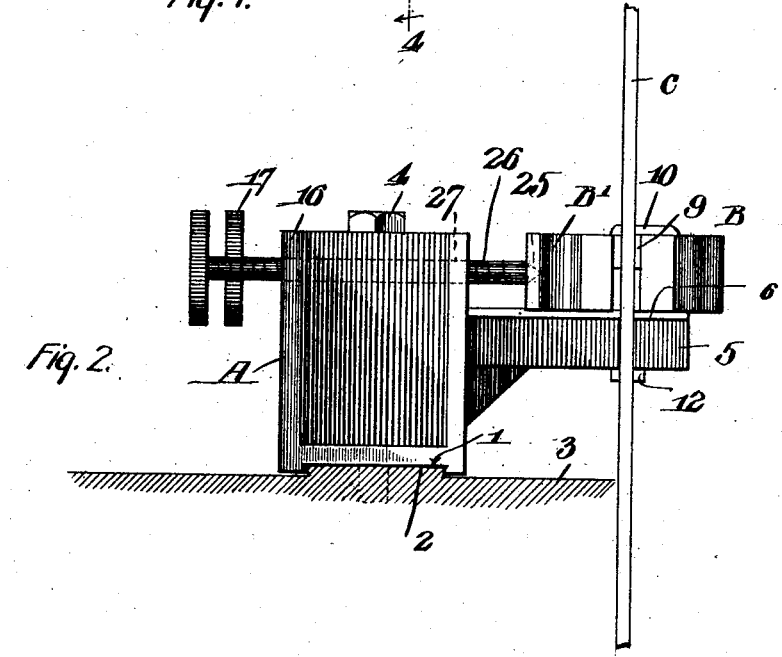

In the accompanying drawings, which illustrate one embodiment of the invention;—Figure 1 is a plan view of the guide in use. Fig. 2 is an end view thereof. Fig. 3 is a vertical section on line 3—3 of Fig. 1. Fig. 4 is a transverse section on line 4—4 of Fig. 1.

Similar reference characters are employed to designate corresponding parts throughout the several views.

Referring to the drawing, A designates the body or frame of the device which may be a metal casting having a longitudinal groove 1 in its bottom surface for receiving the attaching web 2 of the supporting base 3, and the body secured to the base of a bolt 4 passing through the body and screwing into the base. Projecting from one side of the body A is a bracket or supporting arm 5, which, as shown in Fig. 3, has an oppositely beveled top face forming seats 6 and 7 for the guide arms or jaws, the opposite inclination of the seats serving to permit the jaws to be reversed for using the guide on right or left mills.

The guide arms or jaws B and B' rest on the supporting bracket 5 and extend in transverse relation thereto, the free end of the jaws or guides having on their opposed faces dove-tailed sockets 8 for receiving the wearing blocks 9, which engage the opposite side of the saw C to be guided. The arm B is held in place on the bracket 5 by an inverted L-shaped bolt 10, which has its shank disposed in any one of a number of openings 11 in the bracket and on the lower end of the bolt is a nut 12 for holding the bolt in place, with its hook-shaped arm extending across the top of the jaw B. The inner surface of the jaw B has a notch 13 that flares in opposite directions from the center, as shown in Fig. 3, so as to accommodate the shank of the bolt. The jaw or arm B is adjusted by means of a screw 14, which is threaded in openings 15 in the webs 16 of the frame or body A, there being openings 15 at both ends of the frame so as to permit the screw to be changed according to whether the device is to be used on right or left mills. The screw has a hand wheel 17 on one end and at the opposite end it is reduced to provide a shoulder 18 against which bears a washer 19. This reduced end 14' passes through a transverse slot 20 in the arm or jaw B, and on the reduced end of the bolt is a nut 21 between which and the jaw is a washer 22. The side faces of the jaw or arm B are oppositely beveled so as to provide a line contact with the washers. By turning the screw, the same is moved longitudinally while the arm or jaw B swings about the pivot and in this manner the saw engaging extremity of the jaw or arm can be adjusted with respect to the saw.

The jaw or arm B' rests on the bracket 5 at a point between the arm B and frame A, and the saw engaging end is held against the saw by means of a screw 26 which is threaded in openings 27 in the frame or body A, the said openings being centrally disposed between the openings 15 at both ends of the frame so that the jaws B and B' can be reversed. A bolt 24 passes through the jaws at a point between the adjusting screws 14 and 26, and on this bolt is a leaf spring 23 disposed between the jaws and having its free end engaging the jaw B' at a point in line with the screw 26, so that the said jaw will be pressed against the point 25 of the screw, which point forms a pivot or fulcrum for the jaw. The screw 26 can be adjusted by turning so as to bring the arm or jaw B' into proper relation with the saw. It will thus be seen that by the manipulation of the screws, the arms or jaws can be readily set to proper position and merely by taking out the screw 14 and the bolt 10, the jaws or arms B and B' can be taken off for setting them in reverse position.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters Patent, is:—

1. A saw guide comprising a supporting frame, separate saw-engaging members, a pivot for one of the members, means for adjusting the said pivoted member, a spring interposed between the members, and a screw forming a pivot for the other member and also forming means for adjusting the position of such member said spring being arranged to press the said screw-adjusted member against the pivot.

2. A saw guide comprising a supporting frame, saw engaging members or jaws, separate screws for adjusting the jaws, one of the screws forming a fulcrum for one of the jaws, a spring disposed between the jaws and pressing the said jaw against the fulcrum, and a member passing through the jaws for supporting the spring.

3. A saw guide comprising a body, a bracket projecting therefrom, a saw engaging jaw pivoted at an intermediate point on the bracket, means on one end of the jaw for engaging a saw, an adjusting screw mounted on the body and engaging the opposite end of the jaw for adjusting the position of the latter, a second jaw mounted on the bracket, a screw mounted on the body and engaging the second jaw to form a fulcrum therefor and for adjusting the position thereof, and yielding means supported by and disposed between the jaws for holding the same in operative position.

4. A saw guide comprising a body having a centrally disposed lateral projecting bracket, the top surface of the bracket being oppositely beveled to form seats, saw engaging jaws extending across the bracket and both engaging the same seat and adapted to be reversibly mounted on the bracket, an adjusting screw centrally disposed on the body to engage one jaw, a screw adapted to be mounted on either end of the body to engage the other jaw for setting the same, and means operating between the jaws for holding the same in coöperative relation with the saw to be guided.

5. A saw guide comprising a body, a laterally projecting bracket on the body, jaws extending transversely to the bracket, a bolt engaging the outer jaw and forming a pivotal connection between the same and bracket, a screw for adjusting the outer jaw and connected with one end thereof, an adjusting screw engaging the intermediate portion of the other jaw for adjusting the position thereof, and a spring interposed between the outer and inner jaws and serving to tilt the inner jaw on its screw to maintain the said jaw in engagement with the saw.

6. A saw guide comprising a body, separate saw engaging jaws, a pivot for one of the jaws, a screw connected with the pivoted jaw for adjusting the position thereof, a second screw parallel with the first and arranged to engage the other jaw at a point intermediate its ends, a bolt for connecting the jaws together for relative movement, and a spring on the bolt acting between the jaws to hold the same in coöperative relation with the saw to be guided.

In testimony whereof I affix my signature in presence of two witnesses.

CONDA MILLER.

Witnesses:
GEO. R. IMLER,
M. D. IMLER.